(12) United States Patent
Couaillet

(10) Patent No.: US 6,768,719 B1
(45) Date of Patent: Jul. 27, 2004

(54) METHOD AND APPARATUS FOR MOBILE ASSISTED DETECTION OF A TRANSMISSION FAULT ON THE ABIS INTERFACE OF A MOBILE TELECOMMUNICATIONS NETWORK

(75) Inventor: Bertrand Couaillet, Maurepas (FR)

(73) Assignee: Nortel Networks Limited, St. Laurent (CA)

(*) Notice: Subject to any disclaimer, the term of this patent is extended or adjusted under 35 U.S.C. 154(b) by 751 days.

(21) Appl. No.: 09/598,661

(22) Filed: Jun. 21, 2000

(30) Foreign Application Priority Data

Jun. 23, 1999 (EP) .......................... 99401551

(51) Int. Cl.$^7$ ............................... H04Q 7/34
(52) U.S. Cl. .................. 370/242; 370/216; 455/424
(58) Field of Search ............... 370/216, 217, 370/241, 242, 244, 248; 455/67.11, 67.14, 422.1, 423, 424, 425, 8, 9, 67.12

(56) References Cited

U.S. PATENT DOCUMENTS 6,212,375 B1 * 4/2001 Alanara .................. 455/423

FOREIGN PATENT DOCUMENTS

| EP | 0 734 193 | 9/1996 |
| EP | 0 895 435 | 2/1999 |
| GB | 2 287 157 | 9/1995 |

OTHER PUBLICATIONS

Holeman, Alejandro. "CDMA Intersystem Operations". IEEE. Jun. 8, 1994–Jun. 10, 1994. pp. 590–594.*

* cited by examiner

Primary Examiner—Chi Pham
Assistant Examiner—Derrick W Ferris
(74) Attorney, Agent, or Firm—Barnes & Thornburg

(57) ABSTRACT

A mobile telecommunications system comprising a network (30) is described having at least one base station transceiver (31–34) for communication with mobile terminals (50) within a first geographic area (A, B, C, D). The network (30) is adapted for communicating messages to an from the at least one base station transceiver (31–34) which is connected to a first communications link (36–39) of the network (30) for receipt and transmission of user messages. The at least one base station transceiver (31–34) is adapted so that when the at least one base station transceiver (31–34) detects a fault in the first communications link (36–39) the at least one base station transceiver (31–34) continues to transmit a beacon or pilot signal; and the network (30) is adapted to monitor activity of the mobile terminals (50) for determination of whether the beacon or pilot signal is being transmitted from the at least one base station transceiver (31–34). This allows determination of whether the fault is in the data link or in the base station transceiver.

14 Claims, 6 Drawing Sheets

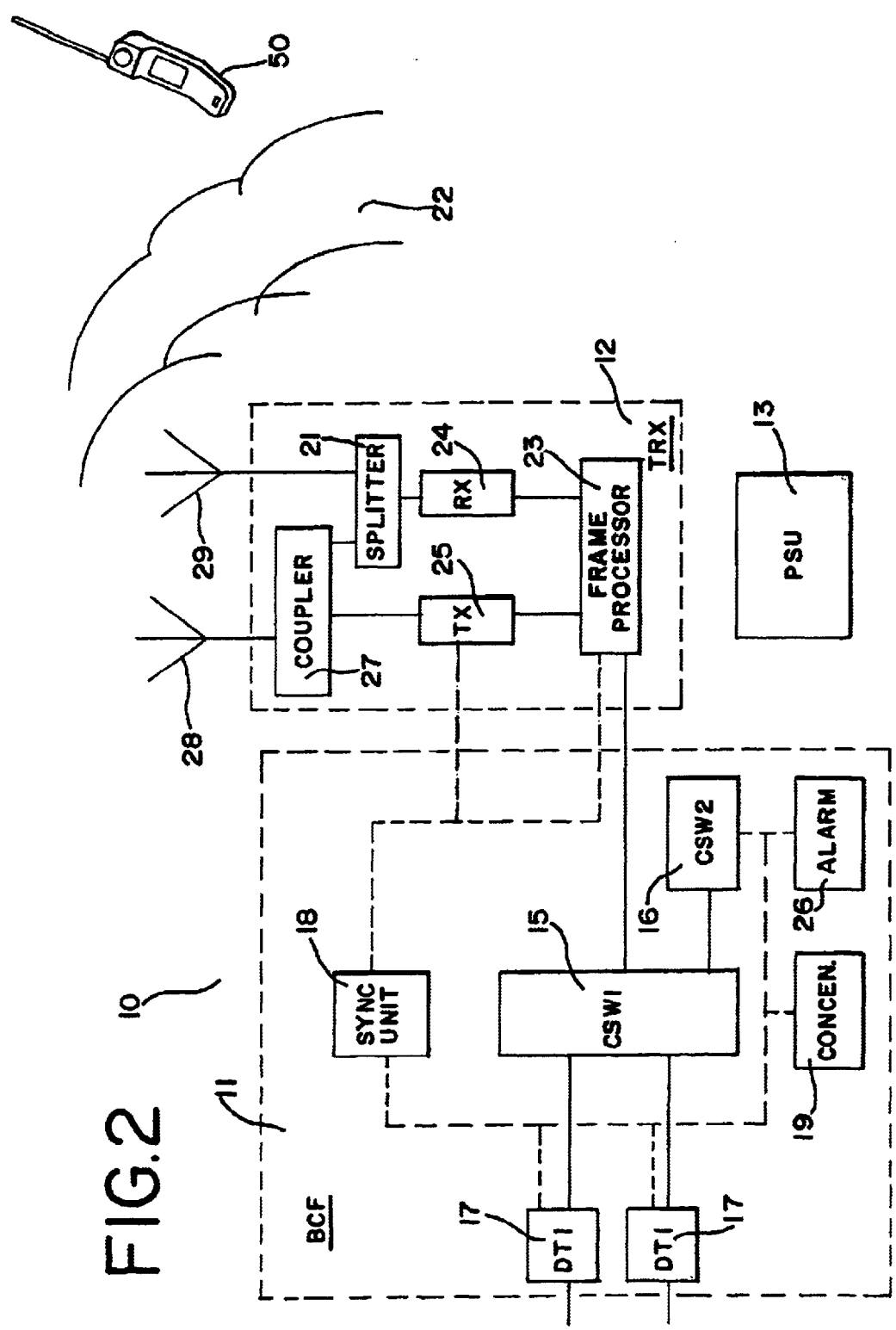

METHOD AND APPARATUS FOR MOBILE ASSISTED DETECTION OF A TRANSMISSION FAULT ON THE ABIS INTERFACE OF A MOBILE TELECOMMUNICATIONS NETWORK

The present invention relates to a method and apparatus for location of faults in a mobile radio telecommunications system as well as a base station and a network element specially adapted for assisting in the location of faults as well, as a method of operating the base station and the network element.

TECHNICAL BACKGROUND

FIG. 1 is a schematic representation of possible organizations of base station transceivers S, M, MS with respect to a base station controller (BSC) 6 in a cellular radio mobile telephone system. Typically, each base station S 1–3, M 1–4, SM 1–9 is connected to the BSC 6 by means of a data telecommunications link 1–5, e.g. a Pulse Code Modulated (PCM) link. There are various ways of arranging the PCM links. One simple way is to connect each base station transceiver S 1–3 by means of a single communications link, e.g. a cable or microwave link 2, directly to the BSC 6 to form a star configuration. Alternative methods include multidrop connections to base station transceivers, e.g. a single multidrop with a linear series of base station transceivers M 1–3 connected together by a communications link 4, or a multidrop configuration in the form a ring of transceivers SM 1–9 connected by a communications link 5 which allows the feed to be either anticlockwise or clockwise.

One problem which is particularly marked with the star configuration is the location of faults. A more detailed drawing of such a known base station transceiver (BTS, 10) is shown in FIG. 2. BTS 10 is similar in architecture to S2000, S4000 or S8000 indoor or outdoor BTS as supplied by Nortel Networks, Guyancourt, France. The BTS 10 includes a base common function unit (BCF) 11, a transmitter receiver unit (TRX) 12 and a power supply unit (PSU) 13. The BCF unit 11 includes a control & switch double board (CSW1 and CSW2) 15, 16 to manage the BTS 10, to configure and supervise the other modules in the BTS 10 as well as to control the BTS operations and maintenance requirements. The BCF 11 also includes an alarm circuit 26 and a signaling concentrator 19. The BCF 11 also provides through the synchronization unit 18 the necessary timing for all the modules in the BTS 10, e.g. the reference clock for TDM radio signals on the air interface 22. The BCF 11 also provides conversion of external signals from the BSC to internal signals and vice versa. The PCM interface (DTI) 17 provides control of the incoming signals from, and the outgoing signals to the BSC usually in the form of pulse code modulated (PCM) signaling. The BCF 11 also provides the necessary switching of the PCM slots, in particular, the multiplexing and demultiplexing of the signaling channels between the TRX 12 and the PCM slots.

The TRX 12 provides full duplex operation on the radio interface 22, e.g. transmission of signals via the transmitter 25 and transmission coupler 27, amplification of the received radio frequency signals from the air interface 22 via the transmission coupler 27 and receiver 24 and TDMA frame processing in the frame processing unit 23. Transmission coupler 27 may be a duplexer. Further, TRX 52 may include a second antenna for spatial diversity, the main antenna 28 and the second antenna 29 being connected to the receiver RX 64 via a splitter 21. Usually, there are several TRX 25 in any transceiver, first of all to provide redundancy and secondly so that at least one TRX may broadcast the beacon or pilot signal which is used by mobile units to locate the cell and to identify the BTS and make contact with it.

Fault situations are summarized in table 1. A fault in the PCM link means that the BTS 10 may be functioning correctly but there is a problem in the cable link from the BSC 6 to the BTS 10. A major fault in the BTS means that the BTS 10 is not able to set up a PCM link to the BSC 6 despite the fact that the PCM communication link is working correctly. A fault in the TRX means that the transmitter is faulty but this can be alleviated by transfer of the functionality of the affected TRX to another TRX.

TABLE 1

| State | Fault in PCM link | Major Fault in BTS | Fault in TRX | Effect on the beacon signal (BCCH) | Operations and Maintenance recognition |
|---|---|---|---|---|---|
| F1 |  | Yes |  | OFF | ? |
| F2 |  |  | Yes | ON (other TRX) | Event reported |
| F3 | Yes |  |  | OFF | ? |

For the state F2 a fault occurs in one of the TRX 25. This results in the operation of this TRX being taken over by another TRX in the BTS 10 so there is no loss of the beacon signal and no loss of user calls provided the capacity is not exceeded. In states F1 and F3 the PCM signal and information derived therefrom (e.g. timing) is not provided within the BCF 11. This may result in no beacon signal being propagated and service being lost. The operation and maintenance system (which may be operated by a different entity than the network provider) cannot distinguish between a fault in the DTI 17 and a fault in the PCM connection to the DTI 17 because it is not provided with sufficient information from the network elements such as the BTS 10 and/or the BSC 6.

Accordingly, when such a fault occurs a crew may be dispatched to test and rectify the fault. This involves going to the BTS 10 in question and determining whether the PCM interfaces 17, the BCF 11, and the TRX's are working properly are working correctly and that therefore the fault lies in the PCM connection. This wastes time and is an expensive solution.

GB 2,287,157 describes an operations and maintenance system for a base station transceiver which is connected to a base station controller to provide remote monitoring of the base station transceiver. The remote monitoring uses the PCM link to the base station transceiver so that loss of the PCM link for some reason means simultaneous loss of the remote monitoring facility.

It is an object of the present invention to provide a mobile radio communications system and a method of operating the same which can be reliably identify faults in a communication link to a base station transceiver without requiring an on-site inspection.

SUMMARY OF THE INVENTION

The present invention includes a mobile telecommunications system comprising network having at least one base station transceiver for communication with mobile terminals within a first geographic area; the network being adapted for communicating messages to an from the at least one base station transceiver; the at least one base station transceiver being connected to a first communications link of the network for receipt and transmission of user messages; the at least one base station transceiver being adapted so that when the at least one base station transceiver detects a fault in the first communications link the at least one base station transceiver continues to transmit a beacon or pilot signal; and the network is adapted to monitor activity of the mobile terminals for determination of whether the beacon or pilot signal is being transmitted from the at least one base station transceiver. A resource manager may carry out the monitoring of mobile terminal behavior. The resource manager may be located in a network element such as a base station controller. The mobile terminal activity to be monitored may be attempts by mobile terminals to handover to the at least one base station transceiver or to perform a forward handover from the at least one base station transceiver to another base station transceiver in the system or to perform a call re-establishment with another base station transceiver, or signal strength measurements of beacon signals from the at least one base station transceiver reported by mobile terminals communicating with a base station transceiver other than the at least one base station transceiver. In a CDMA system the mobile terminal activity may be requests for the at least one base station transceiver to be placed on the Active list as this is an indication that the pilot signal is being received.

The present invention also includes a method of operating a mobile telecommunications system having at least one base station transceiver for communication with mobile terminals within a first geographic area, the at least one base station transceiver being connected to a first communications link for receipt and transmission of user messages; comprising the steps of on detection of a fault in the first communications link the at least one base station transceiver continues to transmit a beacon or pilot signal; followed by: monitoring mobile terminal activity in order to allow determination of whether the beacon or pilot signal is being transmitted from the at least one base station transceiver.

The present invention may also include a base station transceiver for a mobile telecommunications network for communication with mobile terminals, comprising: a monitoring system for monitoring the internal state of components of the base station transceiver handling traffic and/or control signals from or to the network which are to be transmitted to or received from the mobile terminals, respectively and for instructing a transmitter of the base station transceiver to continue transmitting beacon or pilot signals when it is determined that all internal components of base station transceiver are functioning correctly and the traffic and/or control signals from the network are defective, and for instructing the transmitter to stop transmitting the beacon or pilot signals if a fault is detected in one of the components of the base station transceiver and the traffic and/or control signals from the network are defective.

The present invention may also includes a method of operating a base station transceiver for a mobile telecommunications network for communication with mobile terminals, comprising the steps of monitoring the internal state of components of the base station transceiver handling traffic and/or control signals from or to the network which are to be transmitted to or received from the mobile terminals, respectively; and instructing a transmitter of the base station transceiver to continue transmitting beacon or pilot signals when it is determined that all internal components of base station transceiver are functioning correctly and the traffic and/or control signals from the network are defective; and instructing the transmitter to stop transmitting the beacon or pilot signals if a fault is detected in one of the components of the base station transceiver and the traffic and/or control signals from the network are defective.

The present invention may also include a network element for a mobile telecommunications network, the network element being in communication with at least a first and a second base station transceiver over a first and second data link, respectively, the first and second base station transceivers being in communication with a plurality of mobile terminals; the network element comprising: a first device for determining if the first data link to the first base station transceiver is defective, and a second device for providing activity data from mobile terminals received via the second base station transceiver and to allow a decision whether the fault is in the first base station transceiver or in the first data link. The second device may also be adapted to decide whether the fault is in the first base station transceiver or in the first data link.

The dependent claims define further individual embodiments of the present invention.

The present invention will now be described with reference to the following drawings.

BRIEF DESCRIPTION OF THE DRAWINGS

FIG. 2 is a schematic representation of a conventional base station transceiver.

DESCRIPTION OF THE ILLUSTRATIVE EMBODIMENTS

The present invention will be described with reference to certain embodiments and drawings but the invention is not limited thereto but only by the claims. The present invention may be advantageously applied to Time Division Multiple Access (TDMA), Frequency Division Multiple Access (FDMA), Time Division Duplex (TDD) or Code Division Multiple Access (CDMA) mobile radio telecommunications systems or combinations thereof or similar. Representative systems with which the present invention may be advantageously applied are described in (TDMA): "The GSM System for Mobile Communications", by Mouly and Pautet, Cell and Sys, 1992; (CDMA): "CDMA Systems Engineering Handbook", by Jhong Sam Lee, and Leonard E. Miller, and "Wideband CDMA for Third generation Mobile Communications", editors Tero Ojanperä, Ramjee Prasad, both published by Artech House, Boston and London, 1998.

Figure 1:
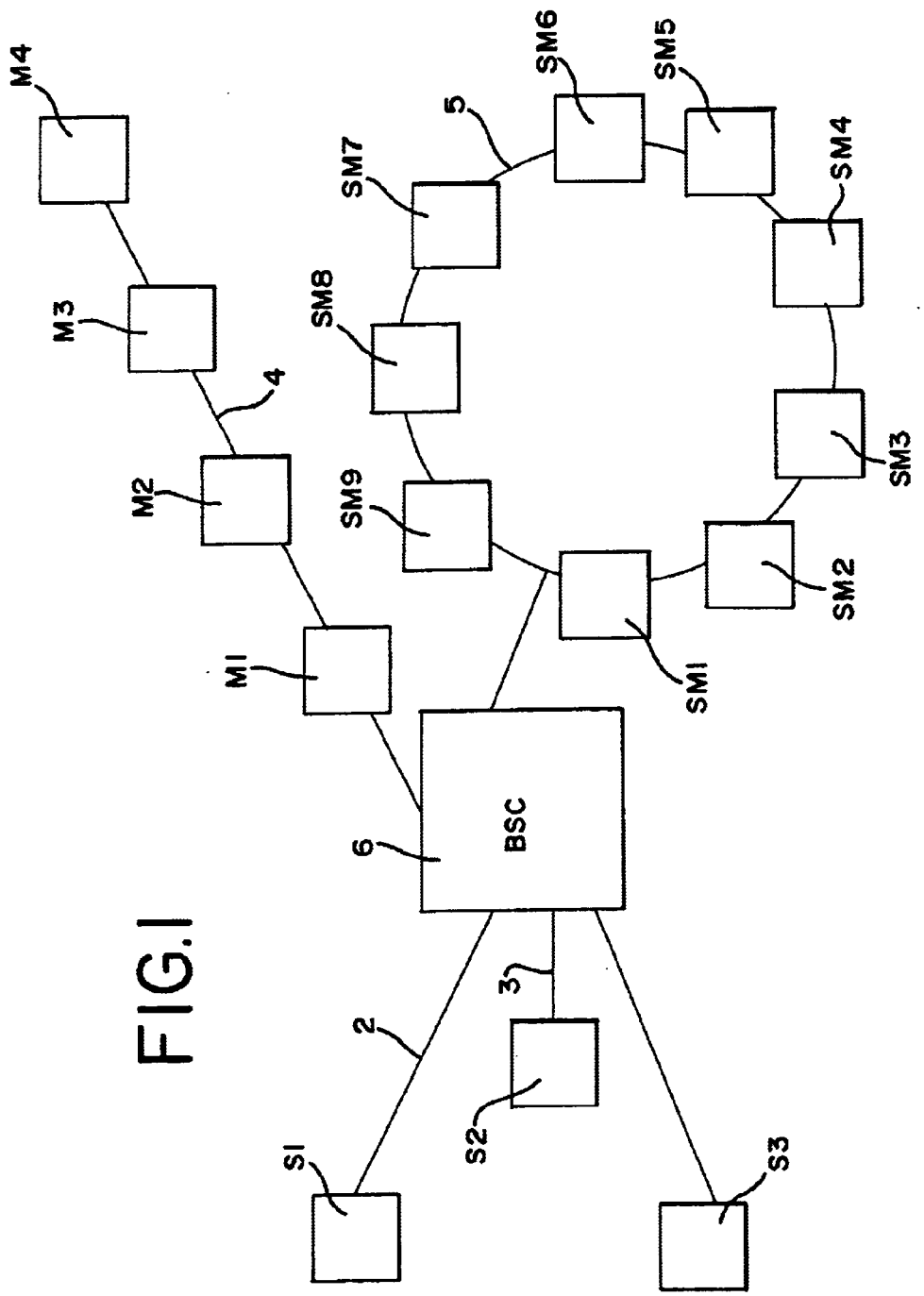
FIG. 1 is a schematic representation of conventional base station transceiver configurations.
Figure 3A:
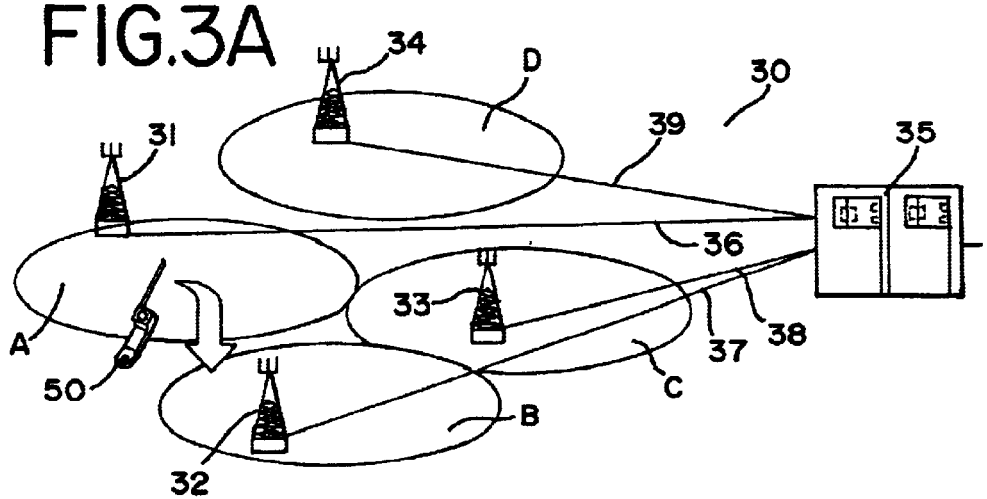
FIGS. 3A to C are schematic representation of a mobile radio telephone system with which the present invention may be used.

FIG. 3A is a schematic representation of a mobile telecommunications system 30 including base station transceivers 31, 32, 33, 34 and a base station controller 35 to which the present invention may be applied. Each base station transceiver 31–34 is associated with a radio coverage area A–D respectively. An operation and maintenance system (OMS) 40 is provided (not shown) which is to some degree separate from the network required for transmitting user messages and is used to gather information from the system 30 and about its operation and also to control this operation. Mobile terminals 51 continuously receive signals not only from a base station with which they are communicating but also from other base stations. Each mobile terminal 51 continuously scans the relevant beacon or pilot signal frequencies and measures the received strength of such signals. These beacon or pilot signal strengths may be reported back to the network through the radio link to a base station transceiver. Alternatively, when a beacon or pilot signal exceeds a certain power level a mobile terminal 50 may request the system 30 to include the transmitting base station transceiver within the Active List of that mobile terminal. If the signal strength and/or communication quality drops below a certain level, each mobile terminal 50 may attempt to handover to another base station, transceiver as is well known to the skilled person. Accordingly, in the normal situation, the OMS 40 can receive information about handover request activity and can determine that handovers are requested between all of the coverage areas A–D.

Once communication of data signals, e.g. of traffic and control signals, has been lost between a controller 35 and a base station transceiver 31–34, this is detected by the controller 35 or other network elements by performing a loop check. The traffic and/or control signals may be sent via PCM. If there is no response from a base station transceiver 31–35 to the loop control test, the controller 35 or other network element reports an error to the OMS 40. At this point neither the OMS 40 nor the BSC 35 knows if the fault is in a communications link 36–39 or within the base station transceiver 31–34.

In accordance with the present invention, each base station transceiver 31–34 is adapted to continue transmitting a beacon or pilot signal after loss of signals on the communications links 36–39 to and from the controller 35. Thus, the base station transceiver continues to transmit beacon or pilot signals if there is a fault external to the transceiver. On the other hand if there is a fault internal to the transceiver 31–34 which cannot be corrected by swapping to a different TRX, the transceiver no longer transmits beacon or pilot signals.

Continuous transmission of beacon or pilot signals when PCM communication has been lost to the main network, may be achieved by providing a stable clock in each base station transceiver 31–35. This clock is normally synchronized with the timing signals received on the communications link 35–39. As soon as the signals on the communications link 35–39 cease, the clock maintains the timing and the relevant base station transceiver 31–34 continues to transmit the beacon or pilot signal in accordance with this timing. Clock stability can be maintained to within 50 ppb (parts per billion) which is sufficiently accurate for several hours of transmissions. On the other hand if there is a fault in the PCM interface 17, there is no provision of timing and the beacon or pilot signal is no longer transmitted. The presence of a fault may be determined by internal diagnostic test within each bas station transceiver which may be carried out by an internal diagnostic test circuit.

The fault table in accordance with the present invention appears an in table 2.

TABLE 2

| State | Fault in PCM connection | Major Fault in the BTS | Fault in TRX | Effect on the beacon signal (BCCH) | Operations and Maintenance recognition |
| --- | --- | --- | --- | --- | --- |
| F1 | | Yes | | OFF | BTS |
| F2 | | | Yes | ON (other TRX) | Event reported |
| F3 | Yes | | | ON | Link |

Figure 3B:
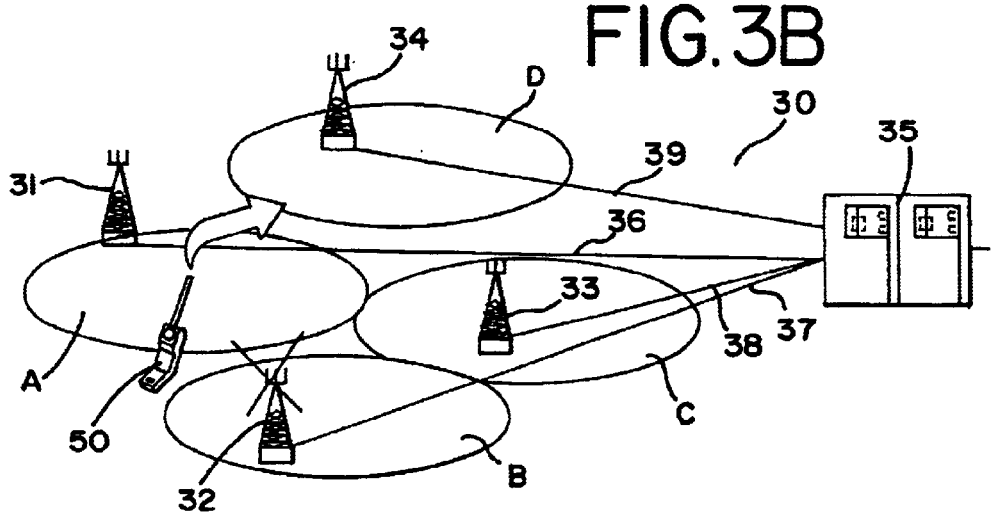

As previously, the state F2 is recognized from within the BTS and is corrected locally by use of an alternative TRX. In states F1 and F3, the PCM connection to the affected BTS has been lost and no network-side communication of faults can be reported to the network 30 or the OMS 40 from the BTS. States F1 and F3 can be distinguished from each other in accordance with the present invention by monitoring the mobile terminal activity. In the case of F1, the beacon signal goes off (transceiver 32 in cell B of FIG. 3B). In accordance with an embodiment of the present invention, if a BTS internal monitoring system detects failure to establish a PCM link from the BTS to the BSC due to a failure of a BTS internal component other than a TRX, the BTS internal monitor requests the relevant TRX to cut the beacon or pilot signal. This means that mobile terminals 50 in adjacent cells (A, C, D if the link to the base station transceiver in B is affected) do not receive any beacon or pilot signals during their regular beacon signal monitoring periods. Hence, no mobile terminal 50 sends back any signal strength reports to the system 30 which record signal strengths from the affected cell (cell B). Further, no mobile terminal 50 attempts to handover to the affected BTS. Thus, handover requests are limited to the remaining cells, i.e. to cells A, C and D.

Figure 3C:
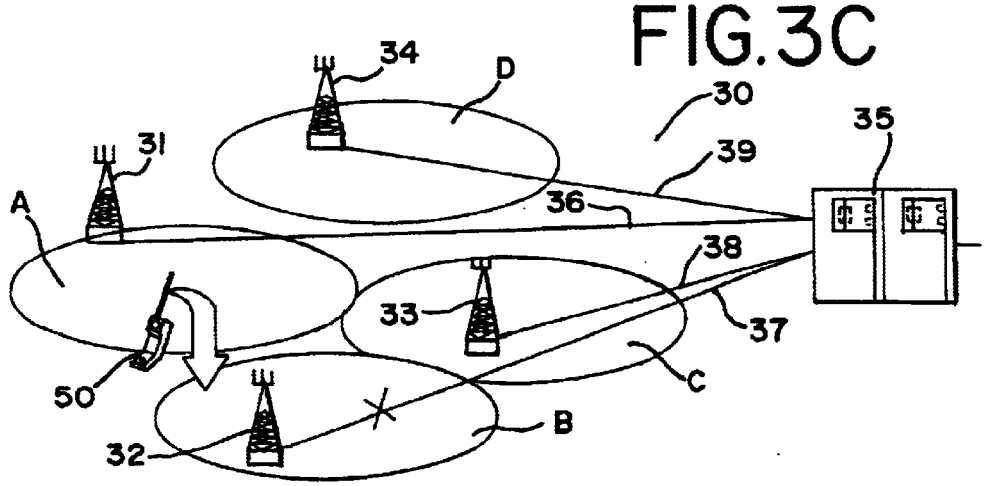

In the case of F3, the beacon signal is maintained (fault in link 37 in FIG. 3C). In this case the BTS internal monitoring system determines that all internal components of the BTS are working correctly, but the PCM link cannot be established. Hence the fault must be in the PCM link. The BTS internal monitoring system then instructs the TRX to maintain the beacon or pilot signal in accordance with the timing of the BTS internal clock. Mobile terminals 50 in adjacent cells A, C, D continue to monitor the pilot or beacon signals from base station transceiver 32 and to report these to the system 30. In addition, some mobile terminals 50 may send a handover request to their current base station with which they communicate to initiate handover to the affected base station or such a handover may be prompted by the network from one of these cells to handover to the affected cell. These requests are monitored by the network 30 and used to determine which of the two states F1 and F3 has occurred. For example, in the case of FIG. 3C, handover requests will be reported for all cells A–D whereas for the case in FIG. 3B the handover requests are limited to cells A, C and D.

Using the methods in accordance with the present invention, it is possible for the network 30 to determine which of the two similar fault states F1 or F3 has occurred within a few minutes after a fault. This allows rapid rectification of the faulty part of the system without sending out crews to determine the state of remote on-site equipment.

Figure 4:
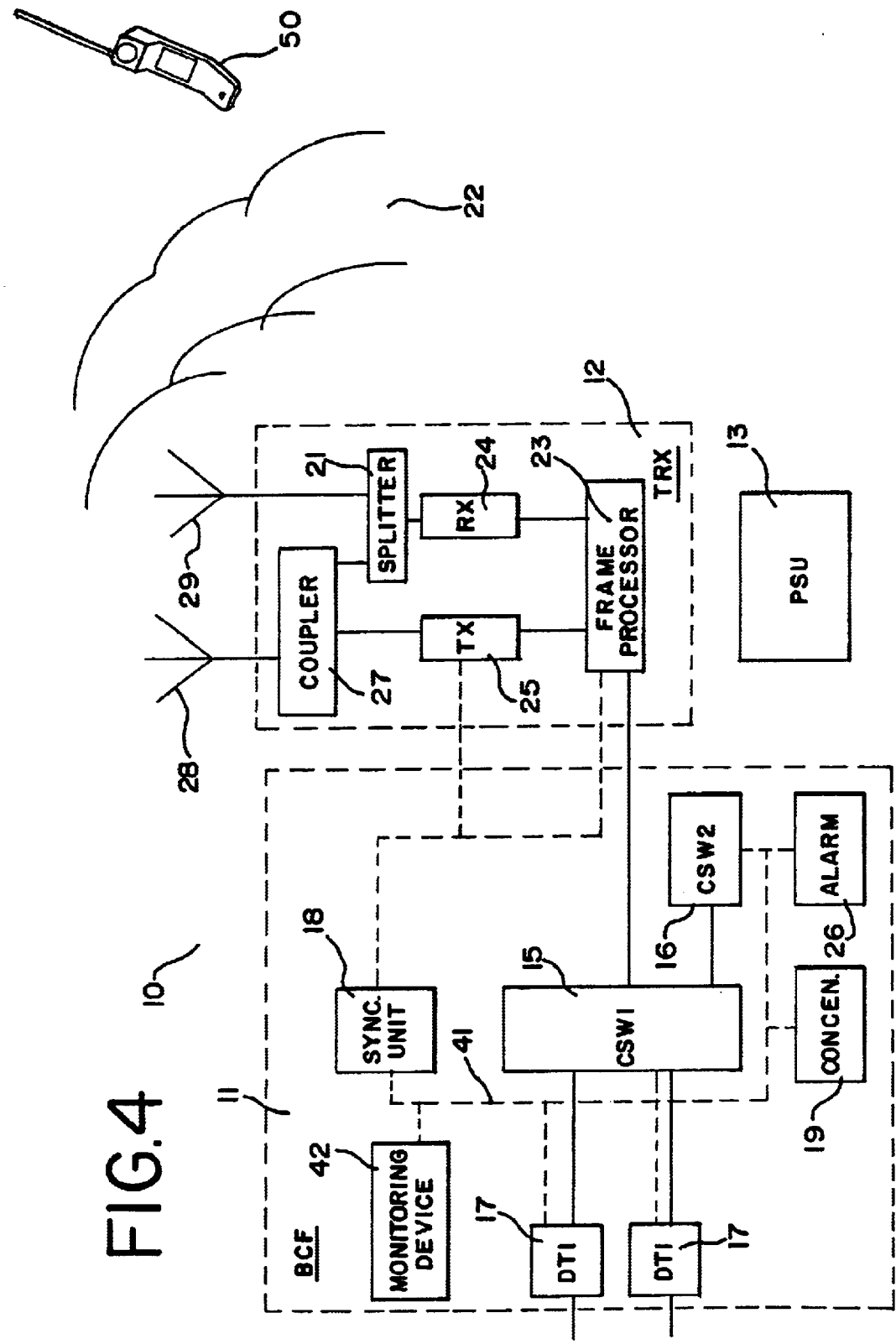
FIG. 4 is a schematic representation of a base station transceiver in accordance with an embodiment of the present invention.

FIG. 4 is a schematic representation of a base station transceiver 10 in accordance with an embodiment of the present invention. Items referred to by the same reference numbers in FIG. 4 have the same meaning as in FIG. 2. The number 42 represents a monitoring device which is coupled to the DTI 17, the TRX 25, the frame processor 23 and the control & switch double board (CSW1 and CSW2) 15, 16 via an internal bus 41. The monitoring device 42 is shown as belonging to the BCF 11 but the present invention is not limited thereto. The monitoring device 42 may be a monitoring system which makes use of intelligent components in the frame processor 23, the control & switch double board (CSW1 and CSW2) 15, 16 and the DTI 17 networked together, the intelligent components including processors capable of communicating with each other and for determining the state of PCM signals within the BTS 10. The monitoring device 42 is configured to check the PCM signal integrity within the BTS 10, i.e. to check if all components handling PCM signals are functioning properly. Examples, of such components are the DTI 17, the frame processor 23 and the control & switch double board (CSW1 and CSW2) 15, 16. The monitoring device 42 is capable of detecting the loss or corruption of the PCM signal arriving from the network via the DTI 17. In the case that no PCM connection is set up with the BSC connected to the BTS 10, the monitoring device 42 checks the internal PCM operation of the BTS 10. Assuming this is functioning correctly, the monitoring device 42 sends an instruction to the TRX 25 to continue sending the beacon or pilot signal. This is based on the logic that if all components are responding correctly, the loss of PCM signals must be caused by a fault in the PCM link to the BTS 10. If the monitoring device 42 detects an internal malfunction in any part of the internal PCM system other than in a TRX, the TRX 25 is instructed to stop sending a beacon or signal. If it is detected that the TRX 25 is not functioning correctly, the duties of this TRX are transferred to another TRX 25. If there is a loss of PCM signal and neither an instruction to continue sending or for terminating the beacon or pilot signal is received by the TRX 25, the default value of this TRX is to terminate sending the beacon signal. This is based on the logic that if neither command signal is received after a PCM failure there must be a major failure within the BTS 10.

Monitoring device 42 may also configured to send a variable number of reports from mobile terminals to the network. During normal operation, monitoring device 42 does not send all the reports from all mobile terminals which record the signal strengths measured by the mobile terminals. However, on receipt of an appropriate high level reporting signal (HiLR signal) from the base station controller (BSC) controlling the BTS 10, more reports are transmitted to the BSC from BTS 10, for example all reports may be sent to the BSC. The HiLR signal is sent from the BSC when a PCM fault has been detected in a cell adjacent to the cell in which BTS 10 is situated. The increased level of reporting is used by the BSC to determine whether the beacon or pilot signal of the affected neighboring cell is still being transmitted and from this to determine if the fault is in the PCM link or in the BTS.

Figure 5:
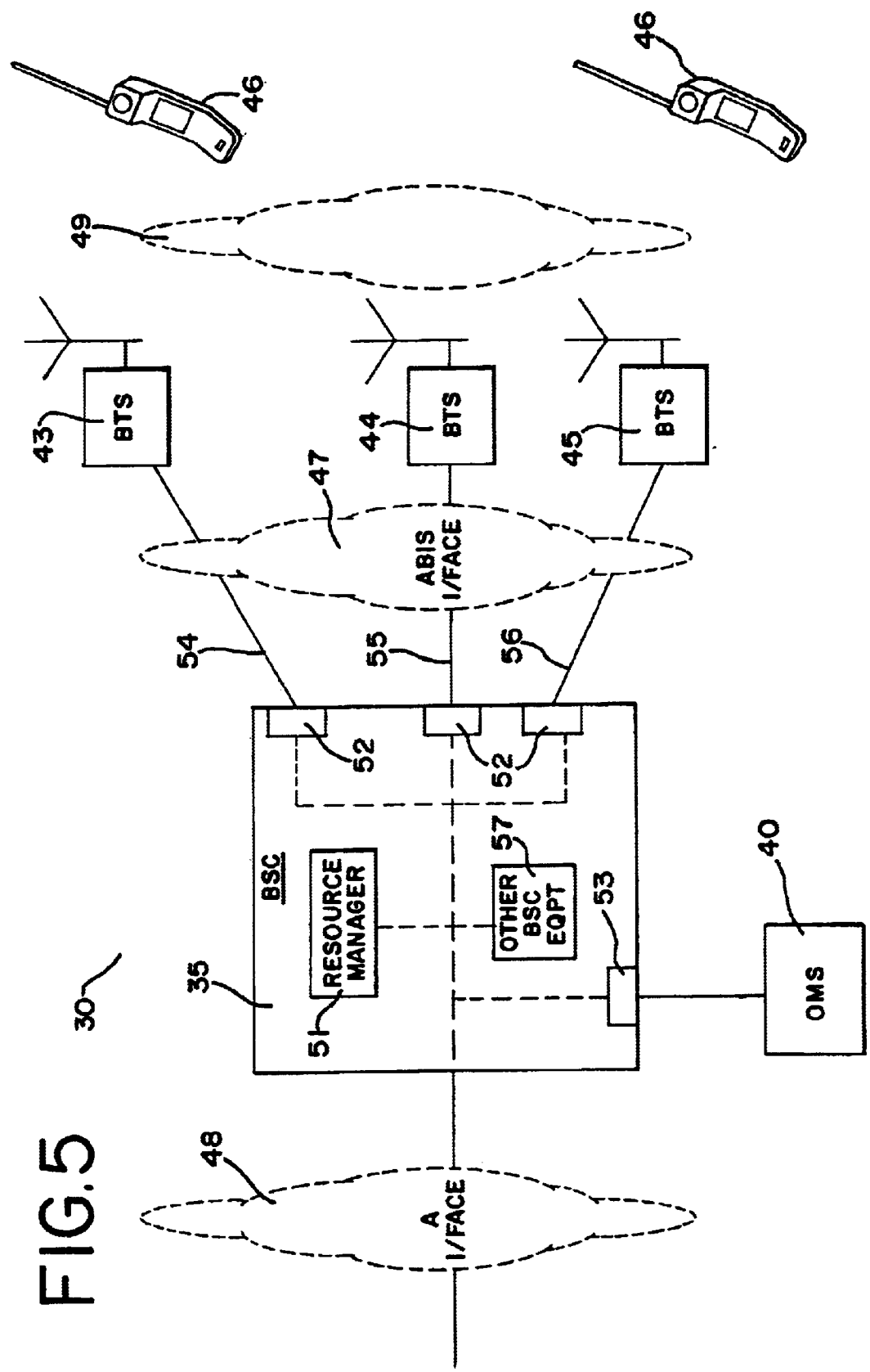
FIG. 5 is a schematic representation of a mobile radio telephone system in accordance with an embodiment of the present invention.

FIG. 5 is a schematic representation of a network 30 in accordance with an embodiment of the present invention. The network 30 includes base station transceivers 43, 44, 45 of the kind shown in FIG. 4, which communicates with a network element, which may be a BSC 35, over an Abis interface 47. The BSC 35 communicates with the rest of the network 30 over the A interface 48. BTS 43, 44, 45 is in communication with mobile terminals 46 over the radio interface 49. On operations and maintenance system (OMS) 40 is in communication with certain of the network elements such as the BSC 35. BSC 35 includes a resource manager 51, e.g. a microprocessor which co-ordinates all the operations of the base station transceivers 43, 44, 45 in communication with it as well as its own operation. In addition to the resource manager 51 there may be provided additional equipment 57 which may include voice channel controllers, scanning receivers, and switches, etc. A least two communication ports 52 is provided for communication with two or more base station transceivers (BTS) 43, 44, 45, e.g. via PCM links 54, 55, 56 as well as a port 53 for communication with an operations an maintenance system (OMS) 40. In addition to other functions, resource manager 51 is adapted to detect loss of the PCM link 54, 55, 56 with any base station transceiver 43, 44, 45, e.g. by loop testing. On detection of a loss of a PCM link to a BTS (e.g. loss of the PCM link 55 to BTS 44) this event is reported to the OMS 40 by the resource manager 51. Resource manager 51 may then begin analysis of all handover and BTS signal strength reports received via ports 52 from BTS 43, 45 originating from the mobile terminals 46. For instance, the resource manager 51 examines these reports for any indications of signal strength measurements of the mobile terminals 46 resulting from the beacon signal of the affected BTS 44. Also, handover requests from mobile terminals 46 arriving via ports 52 from BTS 43, 45 are examined for handovers to BTS 44. If there are no signal strength reports or any signal strength measurements of the beacon signal from the affected BTS 44 nor handover requests which indicate the same within a suitable period of time, the logic of resource manager 51 concludes that BTS 44 is not transmitting a beacon signal. On the other hand if signal strength measurements from the affected BTS 44 are detected and handovers requests thereto recorded, the logic of resource manager 51 decides that the beacon signal from the BTS 44 is still being transmitted. From these decisions the resource manager logic can decide whether the fault lies in the PCM link 55 or in the BTS 44. This decision is transmitted to the OMS 40 for appropriate action.

In addition, resource manager 51 may transmit an HiLR signal to base stations 43, 45 to increase the rate of reporting of signal strengths of beacon signals once it has determined that the PCM link along line 55 is defective. The increased number of reports may be used to increase the speed at which the state of the transmitter of BTS 44 is determined. After the decision has been sent from the BSC 35 to the OMS identifying the location of the fault, a signal may be sent by resource manager 51 to BTS 43, 45 to cancel increased reporting.

Figure 6:
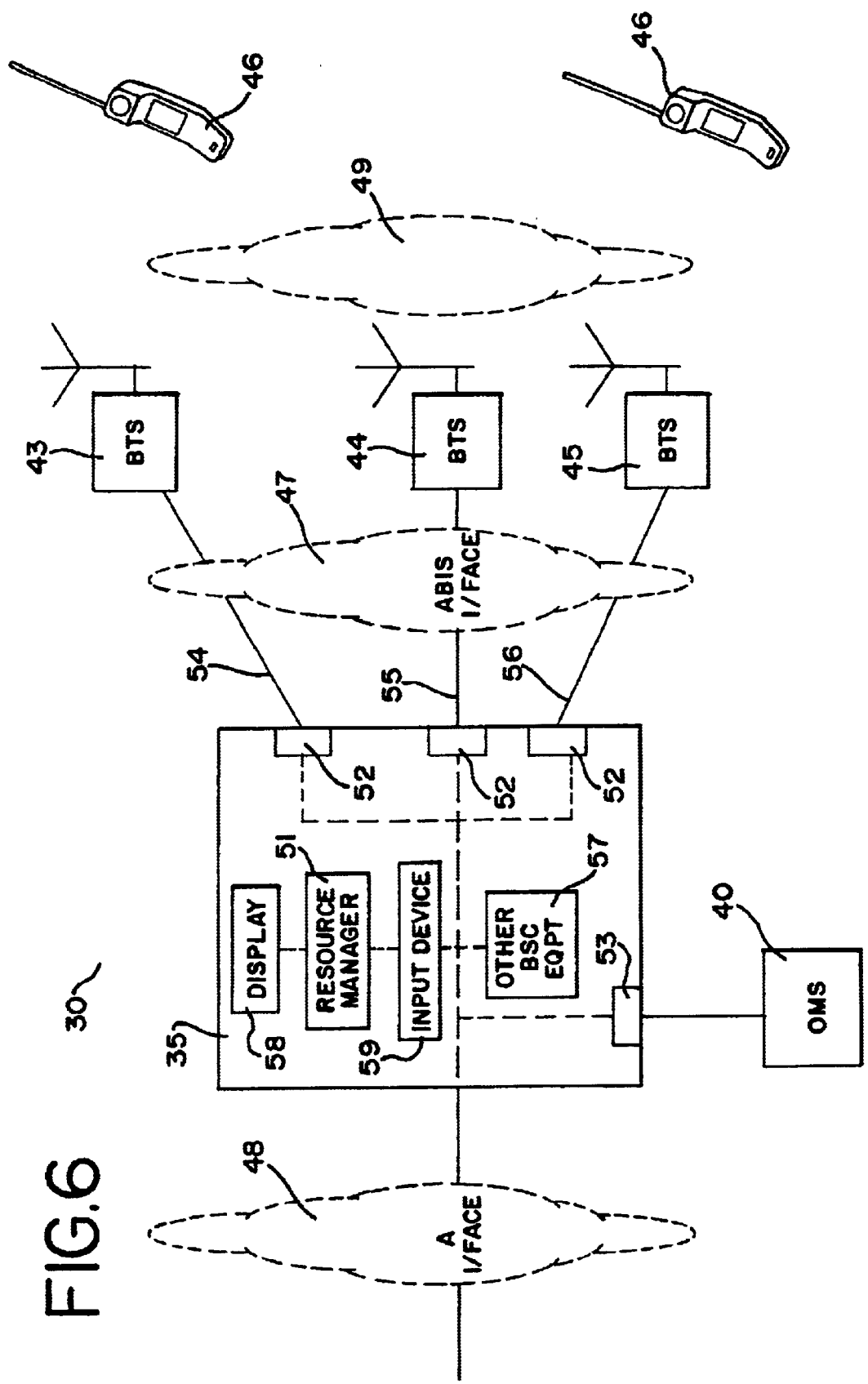
FIG. 6 is a schematic representation of a mobile radio telephone system in accordance with an embodiment of the present invention.

FIG. 6 is a further embodiment of a network 30 in accordance with the present invention. The components having the same reference numbers in FIG. 6 relate to the same items in FIG. 5. In the network 30 shown in FIG. 6 the resource manager 51 in BSC 35 is adapted for manual use. For example, it may be provided with a display 58 such as a VDU and/or a printer and an input device 59 such as a keyboard. When the resource manager 51 detects a fault on a PCM link such as 55, this is reported, e.g. by a visual alarm on display 58 and/or an audible alarm. An operator located at BSC 35 may now interrogate the network 30 via the input device 59 and inform the OMS 40 of the results and recommended action. For instance, the resource manager 51 may include a microprocessor running suitable software programs to identify and extract beacon signal strength measurements received from the mobile terminals 46 via BTS 43, 45 as well as to identify and extract handover requests to the affected BTS 44. These may be displayed on display 58 and updated at regular intervals for analysis and action by the operator. The operator may also initiate a signal to BTS 43, 45 to increase the rate of reporting as has been described with respect to the embodiment of FIG. 5. From the display the operator can determine if there are indications that the beacon signal of BTS 44 is still being transmitted and hence deduce that the fault is in the PCM link 55. The operator can then signal to OMS this result.

While the invention has been shown and described with reference to preferred embodiments, it will be understood by those skilled in the art that various changes or modifications in form and detail may be made without departing from the scope and spirit of this invention. First of all, in accordance with the above embodiments when it is determined by the BTS internal monitoring system that the PCM link is at fault, the beacon or signal is maintained, whereas when the internal monitoring system determines internal failure of a BTS component other than the TRX, the beacon or pilot signal is cut. However, as an alternative embodiment of the present invention, the beacon or pilot may be maintained when there is an internal fault and the beacon or pilot is cut if a PCM link fault is determined. Further, the transmission of the beacon or pilot signal after loss of PCM signals from the network may cause additional unnecessary interference and system confusion including user annoyance over a longer time period. Hence, the transmission of the beacon or pilot signal may be limited by a timer, e.g. to 30 minutes.

In the above, the resource manager 5 has been described as being located in a base station controller 35 but the present invention is not limited thereto. The resource manager 51 may be located in any suitable network element, for example, in a mobile witching center (MSC), provided the necessary connections for receiving beacon signal strength measurements and/or handover requests from mobile terminals are provided.

What is claimed is:

1. A mobile telecommunications system comprising:
   a network having at least one base station transceiver for communication with mobile terminals within a first geographic area;
   the at least one base station transceiver comprising a transmitter for transmitting a beacon or pilot signal to the mobile terminals;
   a communications link connecting the at least one base station transceiver with the network for carrying messages to and from the at least one base station transceiver;
   the at least one base station transceiver comprising a monitoring system which is arranged to detect a fault in the first communications link, the monitoring system being further arranged, upon detecting a fault, to cause the at least one base station transceiver to continue transmitting a beacon or pilot signal;
   and wherein a resource manager has means to monitor activity of the mobile terminals to determine whether the beacon or pilot signal is being transmitted from the at least one base station transceiver.

2. The system according to claim 1, wherein the resource manager is located in a network element.

3. The system according to claim 2, wherein the network element is a base station controller.

4. The system according to claim 1, wherein the mobile terminal activity is:
   attempts by mobile terminals to handover to the at least one base station transceiver, and/or
   requests to perform a forward handover from the at least one base station transceiver to another base station transceiver in the system; and/or
   presence or absence of signal strength measurements of the beacon or pilot signal transmitted from the at least one base station transceiver reported by mobile terminals communicating with a base station transceiver other than the at least one base station transceiver.

5. The system according to claim 1, wherein the system is a CDMA system and the mobile terminal activity is requests for the at least one base station transceiver to be placed on the Active list of a mobile terminal.

6. The system according to claim 1, wherein the monitoring system of the at least one base station transceiver has means to:
   monitor the internal state of components of the base station transceiver handling traffic and/or control signals from or to the network
   instruct the transmitter of the at least one base station transceiver to continue transmitting beacon or pilot signals when it is determined that all internal components of the at least one base station transceiver are functioning correctly and the traffic and/or control signals from the network are defective, and
   instruct the transmitter to stop transmitting the beacon or pilot signals if a fault is detected in one of the components of the at least one base station transceiver.

7. A method of operating a mobile telecommunications system having at least one base station transceiver for communication with mobile terminals within a first geographic area, the at least one base station transceiver being connected to a first communications link for receipt and transmission of user messages; comprising the steps of:
   transmitting, from the at least one base station receiver, a pilot or beacon signal to the mobile terminals;
   monitoring, at the base station transceiver, for a fault in the first communications link;
   upon detecting a fault in the first communications link, continuing to transmit the beacon or pilot signal; and
   monitoring, by another element of the network, mobile terminal activity to determine whether the beacon or pilot signal is being transmitted from the at least one base station transceiver.

8. The method according to claim 7, wherein the network element is a base station controller.

9. The method according to claim 7, wherein the mobile terminal activity is:
   attempts by mobile terminals to handover to the at least one base station transceiver; and/or
   requests to perform a forward handover from the at least one base station transceiver to another base station transceiver in the system; and/or
   presence or absence of signal strength measurements of the beacon or pilot signal from the at least one base station transceiver reported by mobile terminals in communication with a base station transceiver other than the at least one base station transceiver.

10. The method according to claim 7, wherein the network is a CDMA system and the mobile terminal activity is requests for the at least one base station transceiver to be placed on the Active list of a mobile terminal.

11. The method according to claim 7, further comprising the steps, at the at least base station transceiver, of:
   monitoring the internal state of components of the at least one base station transceiver handling traffic and/or control signals from or to the communications link;
   instructing a transmitter of the at least one base station transceiver to continue transmitting the beacon or pilot signals when it is determined that all internal components of the at least one base station transceiver are functioning correctly and the traffic and/or control signals from the network are defective; and instructing the transmitter to stop transmitting the beacon or pilot signals if a fault is detected in one of the components of the at least one base station transceiver.

12. A monitoring system for a base station transceiver for a mobile telecommunications network for communication with mobile terminals, the base station transceiver having a transmitter for transmitting beacon or pilot signals to mobile terminals, the monitoring system having means to:

monitor the internal state of components of the base station transceiver handling traffic and/or control signals from or to the network;

instruct the a transmitter of the base station transceiver to continue transmitting beacon or pilot signals when it is determined that all internal components of base station transceiver are functioning correctly and the traffic and/or control signals from the network are defective, and instruct the transmitter to stop transmitting the beacon or pilot signals if a fault is detected in one of the components of the base station transceiver.

13. A method of operating a base station transceiver for a mobile telecommunications network for communication with mobile terminals, comprising the steps of:

monitoring the internal state of components of the base station transceiver handling traffic and/or control signals from or to the network;

instructing a transmitter of the base station transceiver to continue transmitting beacon or pilot signals when it is determined that all internal components of base station transceiver are functioning correctly and the traffic and/or control signals from the network are defective; and instructing the transmitter to stop transmitting the beacon or pilot signals if a fault is detected in one of the components of the base station transceiver and the traffic and/or control signals from the network are defective.

14. A network element for a mobile telecommunications network comprising at least first and second base station transceivers which serve mobile terminals, the network element comprising:

a first port for communicating with the first base station transceiver over a first data link and a second port for communicating with the second base station transceiver over a second data link;

a first device for determining if the first data link to the first base station transceiver is defective, and a second device having means to receive activity data of mobile terminals from the second data link and to use the activity data to decide whether a fault exists in the first base station transceiver or in the first data link.

* * * * *